United States Patent
Desimone et al.

(10) Patent No.: US 11,896,910 B2
(45) Date of Patent: *Feb. 13, 2024

(54) SYSTEM AND METHOD OF CHEAT DETECTION IN VIDEO GAMES

(71) Applicant: State Space Labs, Inc., New York, NY (US)

(72) Inventors: Kevin Desimone, Halifax (CA); David J. Heeger, Park City, UT (US); Wayne E. Mackey, New York, NY (US)

(73) Assignee: State Space Labs, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/352,050

(22) Filed: Jul. 13, 2023

(65) Prior Publication Data

US 2023/0356093 A1 Nov. 9, 2023

Related U.S. Application Data

(63) Continuation-in-part of application No. 17/975,769, filed on Oct. 28, 2022, which is a continuation of application No. 16/121,210, filed on Sep. 4, 2018, now Pat. No. 11,602,697.

(60) Provisional application No. 63/445,375, filed on Feb. 14, 2023, provisional application No. 62/554,212, filed on Sep. 5, 2017.

(51) Int. Cl.
*A63F 13/798* (2014.01)
*A63F 13/67* (2014.01)

(52) U.S. Cl.
CPC ............ *A63F 13/798* (2014.09); *A63F 13/67* (2014.09); *A63F 2300/535* (2013.01)

(58) Field of Classification Search
CPC combination set(s) only.
See application file for complete search history.

(56) References Cited

U.S. PATENT DOCUMENTS

| | | | |
|---|---|---|---|
| 9,448,634 B1 | 9/2016 | Wakeford et al. |
| 9,448,636 B2 | 9/2016 | Balzacki |
| 10,302,396 B1 | 5/2019 | Ray |
| 11,458,405 B1 | 10/2022 | Welch et al. |
| 2002/0025482 A1 | 2/2002 | Imai |
| 2002/0025842 A1 | 2/2002 | Nobe et al. |
| 2003/0013528 A1 | 1/2003 | Allibhoy et al. |

(Continued)

OTHER PUBLICATIONS

Arstechnica article: Cheat-maker brags of computer-vision auto-aim that works on "any game", Kyle Orland Jul. 9, 2021, https://arstechnica.com/gaming/2021/07/cheat-maker-brags-of-computer.

(Continued)

*Primary Examiner* — Thomas H Henry
(74) *Attorney, Agent, or Firm* — PEARL COHEN ZEDEK LATZER BARATZ LLP

(57) ABSTRACT

A system and method may detect cheating in a computer game, by receiving inputs to a computer game from an entity (which may be a cheater or bot; or a human), comparing the inputs from the entity to data related to inputs to a computer game from human players, and based on the comparing, determining if the entity is a human player or a cheater. The comparing may be based on performance metrics derived from the inputs, and may be by statistical analysis or, comparing a statistical distribution.

20 Claims, 9 Drawing Sheets

(56) References Cited

U.S. PATENT DOCUMENTS

| | | | |
|---|---|---|---|
| 2004/0242321 A1* | 12/2004 | Overton | A63F 13/75 463/29 |
| 2006/0097453 A1 | 5/2006 | Feldman et al. | |
| 2006/0223041 A1 | 10/2006 | Beck et al. | |
| 2007/0163427 A1 | 7/2007 | Rigopulos et al. | |
| 2009/0118010 A1 | 5/2009 | Ashida et al. | |
| 2009/0258703 A1 | 10/2009 | Brunstetter | |
| 2010/0240458 A1 | 9/2010 | Gaiba et al. | |
| 2011/0281639 A1 | 11/2011 | Porat | |
| 2012/0142429 A1 | 6/2012 | Muller | |
| 2013/0072297 A1 | 3/2013 | Seegers et al. | |
| 2013/0128022 A1 | 5/2013 | Bose et al. | |
| 2014/0243077 A1 | 8/2014 | Choi | |
| 2015/0238866 A1* | 8/2015 | Khabazian | A63F 13/75 463/7 |
| 2016/0055236 A1 | 2/2016 | Frank et al. | |
| 2016/0262680 A1 | 9/2016 | Martucci et al. | |
| 2016/0267804 A1 | 9/2016 | Pemba et al. | |
| 2017/0086712 A1 | 3/2017 | Mauro et al. | |
| 2017/0087453 A1 | 3/2017 | Poisner et al. | |
| 2017/0087470 A1 | 3/2017 | Bostick et al. | |
| 2017/0287287 A1 | 10/2017 | Froy et al. | |
| 2017/0290504 A1 | 10/2017 | Khaderi et al. | |
| 2018/0095524 A1 | 4/2018 | Chew | |
| 2019/0046836 A1 | 2/2019 | Starkey | |
| 2019/0070512 A1 | 3/2019 | Fuller et al. | |
| 2019/0216392 A1 | 7/2019 | Bower et al. | |
| 2020/0111385 A1 | 4/2020 | Issa et al. | |
| 2020/0289886 A1 | 9/2020 | Starkey | |
| 2022/0198368 A1 | 6/2022 | May | |
| 2023/0052175 A1 | 2/2023 | Fuller et al. | |

OTHER PUBLICATIONS

Office Action of U.S. Appl. No. 18/083,928, dated Jul. 24, 2023.

Ian Donovan et al. "Assessment of Human Expertise and Movement Kinematics in First-Person Shooter Games" Front. Hum. Neurosci., Nov. 29, 2022, Sec. Motor Neuroscience vol. 16—2022.

Boritz, James, Kellogg S. Booth and Wiliam B. Cowan. "Fitts" Law Studies of Directional Mouse Movement. 1991.

Fitts, P. M. "The information capacity of the human motor system in controlling the amplitude of movement" *Journal of Experimental Psychology*, 47(6), 381-391, Jun. 1954.

McDougle, S.D., Taylor, J.A. "Dissociable cognitive strategies for sensorimotor learning" Nat Commun 10, 40 (2019).

Müller H, Sternad D. "Decomposition of variability in the execution of goal-oriented tasks: three components of skill improvement" J Exp Psychol Hum Percept Perform. Feb. 2004;30(1):212-33. doi: 10.1037/0096-1523.30.1.212. PMID: 14769078.

Looser, Julian. "On the Validity of Using First-Person Shooters for Fitts' Law Studies." University of Canterbury, (2005).

Shmuelof L, Yang J, Caffo B, Mazzoni P, Krakauer JW. "The neural correlates of learned motor acuity" J Neurophysiol. Aug. 15, 2014;112(4):971-80. doi: 10.1152/jn.00897.2013. Epub May 21, 2014. PMID: 24848466; PMCID: PMC4122746.

Wilterson, S. A. "Implicit Recalibration and Strategic Compensation in Learned and De Novo Motor Skills" (Ph.D. thesis). Princeton University, 2021.

Zhai, S., Kong, J., and Ren, X. "Speed-accuracy tradeoff in fitts' law tasks—on the equivalency of actual and nominal pointing precision" Int. J. Hum. Comput. Stud. 61, 823-856, 2004, doi: 10.1016/j.ijhcs.

https://aimlab.gg/ printed on May 5, 2023.

* cited by examiner

SYSTEM AND METHOD OF CHEAT DETECTION IN VIDEO GAMES

RELATED APPLICATION DATA

The present application claims benefit from U.S. provisional Patent Application No. 63/445,375, filed on Feb. 14, 2023, entitled "CHEAT DETECTION FOR VIDEO GAMES", and the present application is a continuation-in-part (CIP) of prior U.S. application Ser. No. 17/975,769, entitled "SENSORIMOTOR ASSESSMENT AND TRAINING", filed on Oct. 28, 2022, which in turn is a continuation of prior U.S. application Ser. No. 16/121,210, entitled "SENSORIMOTOR ASSESSMENT AND TRAINING", filed on Sep. 4, 2018, which in turn claims benefit from U.S. provisional patent application 62/554,212, filed Sep. 5, 2017, each incorporated herein by reference in its entirety.

FIELD OF THE INVENTION

The present invention relates generally to the field of detecting cheating in video games and esports, for example by analysis of inputs of a purported human player compared with inputs from real human players.

BACKGROUND OF THE INVENTION

In video games and esports (e.g., first-person shooter games), human players may interact with the game via an input device (e.g., a computer mouse and keyboard, game controller for a game console such as the Microsoft Xbox system or the Sony PlayStation system). The human player may for example perform coordinated movements of the input device to control an on-screen object or view (e.g., an avatar) in the virtual environment of the game. Performance metrics may be determined.

Human performance in first-person shooter (FPS) video games relies on acquired perceptual and motor skills. Competitive players dedicate years to advancing these skills. Successful FPS play requires efficient identification and localization of relevant visual stimuli, and dynamic movements coordinated with well-timed shot responses.

Some players cheat by running or executing a second computer program (e.g., an aim bot or trigger bot) that is operating in parallel on the same computer as the computer program used to play the game (e.g., an esports game or a video game). The player or entity may be identified to the gaming system as a certain human player, but may have its input provided or aided by a bot. Some aim bot or trigger bot computer programs read from the computer memory to determine the state of a first computer program (e.g. the game) including the locations of targets or opponents. Other aim bot or trigger bot computer programs read from the computer's frame buffer and apply computer vision and image processing algorithms to detect and locate targets or opponents. Some aim bot computer programs then write to memory in such a way as to automatically aim at and shoot the targets without the need for the player to move or manipulate their input device. Some aim bot computer programs provide an input signal (e.g., via a USB connector) to mimic an input device to automatically aim at and shoot the targets without the need for the player to move or manipulate their input device. Some aim bot computer programs aid a human player, automatically correcting for the human player's error or inaccuracy in aiming at and shooting targets, and such players may be considered cheaters. Some trigger bot computer programs cause the cheater's weapons to automatically fire when a target is in the crosshairs. These aim bot programs may be considered cheaters, and may purport to be providing input identified as a human player.

It is well known in the gaming industry that humans are not equipped to detect cheaters without the use of computer processes. Existing cheat detection technology or software is also not equipped to detect many advanced cheaters. It can be hard for cheat detection technology to differentiate between external emulated inputs and legitimate pro-level human gameplay.

SUMMARY OF THE INVENTION

A system and method may detect cheating in computer games and esports (e.g., first-person shooter games), by receiving inputs to a computer game from an entity (which may be a cheater or bot; or a human), comparing the inputs from the entity to data related to inputs to a computer game from human players (e.g. a validated database), and based on the comparing, determining if the entity is a human player or a cheater. The comparing may be based on performance metrics derived from the inputs, and may be by statistical analysis or comparing a statistical distribution. A process may acquire a validated database of performance metrics from human players, characterize the statistical distribution of these human performance metrics, and compare this to performance metrics from a new player to determine if the new player is a human or is a cheater (e.g., an aim bot or trigger bot in a first-person shooter game).

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
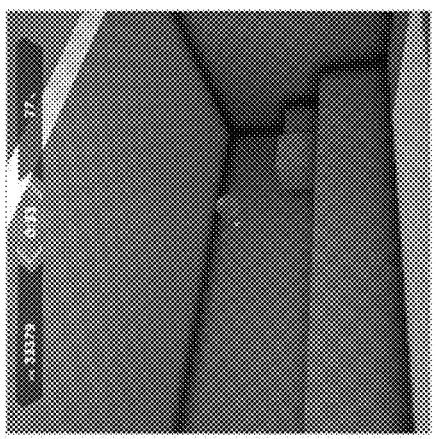
FIG. 1 depicts screenshots for an Adaptive Reflexshot task scenario, according to some embodiments.
Figure 1:
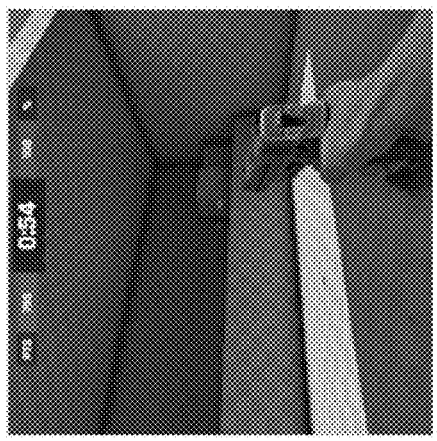
Figure 1:
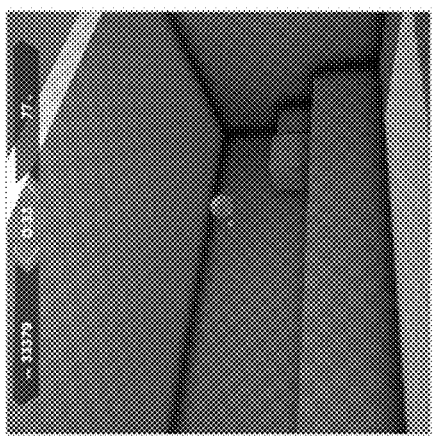
Figure 1:
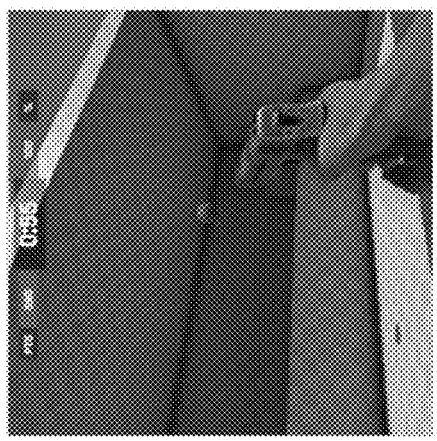
Figure 1:
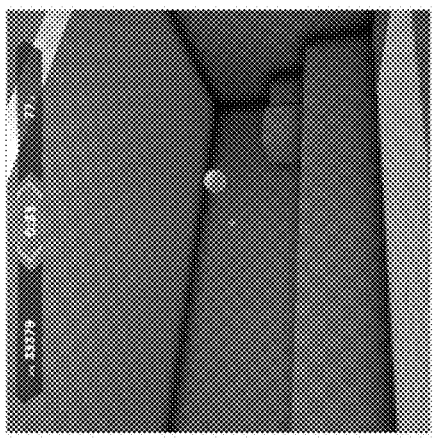
Figure 1:
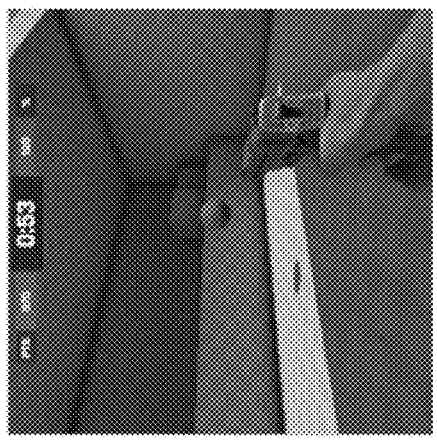

It will be appreciated that for simplicity and clarity of illustration, elements shown in the figures have not necessarily been drawn to scale. For example, the dimensions of some of the elements may be exaggerated relative to other elements for clarity. Further, where considered appropriate,

DETAILED DESCRIPTION OF THE PRESENT INVENTION

One skilled in the art will realize the invention may be embodied in specific forms other than the examples presented herein without departing from the spirit or essential characteristics thereof. The foregoing embodiments are therefore to be considered in all respects illustrative rather than limiting of the invention described herein. Scope of the invention is thus indicated by the appended claims, rather than by the foregoing description.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer or other electronic computing device, that manipulates and/or transforms data represented as physical (e.g., electronic) quantities within the computer's registers or memories into other data similarly represented as physical quantities within the computer's registers and/or memories or other non-transitory storage medium that may store instructions to perform operations and/or processes.

One embodiment for a cheat detector is incorporated into the first computer program (e.g., an esports game or a video game), that compares performance metrics of a newly-seen entity or player with a database, e.g. a validated database, of performance metrics from human players. An embodiment may determine if the newly-seen player is a real human player; or a cheater. A cheater may be considered to be a bot or automatic process, or a person using or aided by such a bot or automatic process; a bot may be used by a person who is cheating. A cheater may be detected when the new player's performance metrics are inconsistent with a database of performance metrics from real human players. When discussing analyzing or processing input, a "player" or "entity" includes a real human player; and also a newly-seen player which may be a bot or automated process (e.g. a cheater); a person aided by or using a bot or automated process (also a cheater); or a real human player (e.g., not a cheater).

Player inputs may be used to calculate performance and performance metrics, and may include manipulation of the input device (e.g. computer mouse, Wii controller, keyboard, mobile computing device (e.g. tablet), mobile telephone, game controller, etc.) to move a player, or move a player's aim (or the aim of a weapon), or the view of the player; and also trigger or provide shot input to fire an in-game device; and also input to move the player in a game. Inputs other than moving a player, or aim, or performing a shot, may be used. Input by a player or entity (e.g. a bot) may include a series of data points, e.g. mouse movements or game controller movements, and inputs may also refer to the data generated by such devices, e.g. a series of data points generated by an input device (or data purported to be such data points). Other inputs may be used. For example a user may move a mouse to alter the aim and field of view of the player, and click on a mouse button to fire a weapon in a game. Measures of speed, precision, accuracy, swipiness, etc. may be based on the relationship between game entities (e.g. targets, player point of views (POVs), the aim of a weapon), the movement of these entities (e.g. the aim of a weapon moving, a target moving), and the timing of entity actions (e.g. a weapon firing, a target appearing, etc.). For example, the precision of a shot triggered by user input to a mouse or game controller may be determined by the point of aim (e.g. crosshairs) at the time of the shot, relative to the point or position of the intended target. A user may move their avatar or player by, for example keyboard input (e.g. the known arrow key or WASD input method), which in turn may affect the game entity of the player's point of view, which is often in FPS games coextensive with the entity of the crosshairs or aim of the virtual weapon. The player may use the input device to aim the weapon, which typically means aiming the POV, and may provide trigger input to the input device to fire the weapon. Other methods of user input may be used. The trajectory or movement of the aiming or crosshairs may be used to measure player movement, e.g. swipiness. The crosshairs or aiming position of the weapon may determine where the shot lands: for example if the crosshairs are pointed at/displayed over the center of the target when the shot is fired, the shot is determined to be or deemed to be at the center of the target. Other systems may have a more complex relationship between crosshairs, a target, and the landing point of the shot, e.g. by taking into account simulated gravity, which drops a simulated projectile over a distance.

Evaluations, calculations, displays, etc. as described herein are typically performed automatically, using a computer system as described herein, typically based on user (e.g., the player of the game) input and/or input from a cheating process, e.g. a bot or aim bot. Player activity as described herein (e.g. flicking, firing a shot) is typically provided as input to a computer system, the player typically viewing a computer-generated display. A player or entity "moving" may refer, for example, to a user or entity providing input which causes some displayed representation of an on-screen object (e.g., an avatar, or crosshairs) in the virtual environment of the game to move, or to move or reorient the field of view.

Performance Metrics

Performance metrics in some embodiments can include movement kinematics. Players often aim for a target by initiating a movement toward the target, increasing and then decreasing movement speed, and firing a shot after slowing down or coming to a full stop. In some embodiments, the kinematics of these movements are characterized by fitting a sigmoid or other function or line to the movement time-series (e.g. based on player inputs or parsed inputs). The best-fit parameter values of the sigmoid or other function for a movement, player input or parsed input may indicate movement amplitude (e.g., amplitude of the sigmoid), movement accuracy (e.g., angular distance between the target and the landing point of the movement), movement speed (e.g., slope of the sigmoid), movement variability (e.g., median across a number of movements of the absolute angular distance between the target and the landing point of the movement; other methods of computing variability are contemplated, as discussed elsewhere herein) movement precision (e.g., 1 over the movement variability), and reaction time (e.g., time point at which the sigmoidal movement was initiated).

Performance metrics in some embodiments can include swipiness. In addition to typical flick-and-land movements, players sometimes choose to maximize speed by shooting "on the fly" instead of slowing down before firing, a tactic referred to as a "swipe" movement. For swipes, the endpoint of the movement is well past the target location. There is a continuum of swipiness with the ideal flick-and-land and the ideal swipe corresponding to two ends of the continuum. Human movement kinematics depend on task demands: reaction time is shorter, and movements are less precise and more swipy, for a game scenario that incentivizes speed over precision.

Performance metrics in some embodiments can include shot performance, e.g., shot time (e.g., time interval between target appearance and the first shot directed toward that target) and shot error (e.g., angular distance between that first shot and the center of the target), each as a function of target size and target angular distance (e.g., angular distance between the player's orientation and the target location).

Performance metrics in some embodiments can characterize the number of corrective movements to hit a target. A player may miss the target on their first attempt, requiring a corrective movement. There are sometimes multiple corrective movements. Performance metrics can include the median (e.g. across a number of shot attempts) number of corrective movements to hit a target and the proportion of targets for which the player hits the target with N movements (where N is a positive integer).

Performance metrics in some embodiments can include the proportion of movements for which there is no shot associated with the movement.

Embodiments of the invention may calculate or determine performance metrics, e.g. based on player input (e.g. from a human player or a bot or a human being aided by a bot), which may used to evaluate a player. Such metrics may include movement kinematics such as, for example, movement amplitude, movement speed, accuracy of movement landing point, reaction time between target appearance and initiation of the movement, each as a function of target size (e.g., which depends on distance in the virtual environment of a first-person shooter game); metrics may include relationships between these example kinematics. Performance metrics may include swipiness (e.g., tendency to shoot while in motion rather than landing on a target before shooting in a first-person shooter game). Performance metrics may include shot performance in a first-person shooter game, e.g., shot time (e.g., time interval between target appearance and the first shot directed toward that target) and shot error (e.g., angular distance between that first shot and the center of the target), each as a function of target size and target angular distance (e.g., angular distance between the player's orientation and the target location in the virtual environment of a first-person shooter game). Performance metrics may include the number of corrective movements to hit a target in a first-person shooter game. Other performance metrics may be used.

Human behavior is known to exhibit tradeoffs between these various performance metrics. Human performance exhibits speed-accuracy tradeoffs or relationships, e.g., the speed at which a response or action is made is negatively correlated with the accuracy or precision of that action. People can be very fast and less accurate, very accurate and slow, or somewhere in between. Speed-accuracy tradeoff can be evident for different aspects of speed (e.g., reaction time, movement speed, shot time) and different aspects of accuracy (e.g., percent of correct responses/decisions, movement accuracy and variability, shot error). A hallmark of speed-accuracy tradeoff is the ability of humans to adapt to current demands and prioritize speed and accuracy relative to each other. If a task requires very fast responses or movements, a person may sacrifice accuracy to maximize speed. If there is a high cost to misses, a person may take longer to respond or move more slowly to maximize accuracy.

Violations of a speed-accuracy tradeoff may indicate cheating. Some embodiments perform a statistical analysis to characterize the multivariate probability density of a database (e.g. a validated database) of human performance metrics. For example, a probability density can characterize the likelihood of movement being a real human movement with a particular combination of performance metrics (e.g., movement amplitude, movement speed, movement accuracy, movement reaction time, swipiness, shot time, and shot error), given the target size and target angular distance. Some embodiments perform a statistical analysis to determine if performance metrics from a new player are statistical outliers. Having characterized the multivariate probability density of performance metrics from a validated database of human movements, cheating can be detected by determining the likelihood that a new player is a human player, e.g., the likelihood of the performance metrics from the new player with respect to the probability density of the validated database of human performance metrics.

Speed-accuracy tradeoff in FPS performance can be characterized, for example, in terms of movement kinematics (e.g., reaction time to initiate a movement, movement speed, movement accuracy, variability or precision of a plurality of movements). Speed-accuracy tradeoff can be characterized in terms of shot performance (e.g., the time it takes to fire a shot and the error of that shot).

Different measures of speed can be substituted for shot speed (e.g. shots per second), and may be considered performance metrics. Embodiments can compute a speed performance metric as hit rate (e.g., in units of hits per second), movements per second, mean or median movement speed (e.g., in units of cm per second, degrees per second, pixels per second, etc.), or peak speed in a movement. Speed can be computed by for example: 1) determining the elapsed time between target spawn or appearance and the first shot fired (e.g. an input to fire a shot received from a game controller), separately for each target; 2) computing the mean or median elapsed time for this spawn-shot time across a plurality of targets; and 3) computing 1 divided by that mean or median elapsed time. In one embodiment precision can be computed by: 1) computing the shot error of the first shot that was fired at each target (e.g., the distance between the landing point of the shot in the game and the center of the target); 2) computing the mean or median of the shot error across a plurality of targets; and 3) computing 1 divided by that mean or median shot error. Other measures of precision may be used.

Aim Lab

Embodiments may be used with Aim Lab™ FPS video game, and Aim Lab™ systems may be used to validate embodiments of the disclosed invention. Aim Lab includes a collection of tasks (e.g., mini-games) that replicate FPS gaming scenarios. To validate some aspects of the disclosed embodiments, data from human Aim Lab players was analyzed to characterize human performance. These human performance metrics were compared with performance metrics from a non-human aim bot, a computer program that automatically aims and shoots at the targets. Aim bot or trigger bot programs may not mimic inputs corresponding to natural human movements and reaction times, and may not exhibit the same performance metrics as human players. For example, aim bot reaction times may be unrealistically short, movement speeds may be unrealistically fast, and precision may be unrealistically good. Moreover, the aim bots may not exhibit tradeoffs that are typical of humans. For example, aim bot movement precision may not trade off against movement speed or amplitude.

The Aim Lab™ system is a commercial software product written in the C# programming language using the Unity game engine. Unity is a cross-platform video game engine used for developing digital games for computers, mobile devices, and gaming consoles. Players download an Aim Lab™ system to their desktop or laptop PC. While Aim Lab is one example system used with embodiments of the present invention, other systems may be used.

Players control their virtual weapon in Aim Lab™ tasks using a mouse and keyboard while viewing the game on a computer screen. Performance data are uploaded to Aim Lab™ secure servers. Aim Lab™ includes a large number of different task scenarios for skill assessment and training, each tailored to a facet of FPS play. These task scenarios assess and train visual detection, motor control, tracking moving targets, auditory spatial localization, change detection, working memory capacity, cognitive control, divided attention, and decision making. Tasks can be customized to prioritize accuracy, speed, and other basic components of performance. During a round, players are granted points for each target that they successfully shoot and destroy. In some tasks, additional points are rewarded for targets destroyed more quickly. Players attempt to maximize their score on each round by destroying as many targets as possible. Different task scenarios incentivize players to prioritize accuracy over speed or to prioritize speed over accuracy.

One fundamental facet of FPS play is called "flicking"—rapidly moving the crosshair to a target or opponent and firing a shot to damage or destroy the target. When playing with a computer mouse and keyboard, for example, flicking is achieved primarily by hand and arm (e.g., reach) movements. Some embodiments utilize task scenarios that assess flicking skill, e.g., rapid ballistic movements to destroy stationary targets. Specifically, embodiments utilize flicking tasks with different target sizes and/or different target presentation durations, to characterize each player's performance metrics including speed-accuracy trade-offs. A variety of ways to compute speed for determining flicking skill may be used.

One example of a task scenario in Aim Lab™ is the Adaptive Reflex or Reflexshot task (an example of which is shown in FIG. 1). In this task scenario, one target at a time appears in a randomized location, confined to an imaginary ellipse in front of the player's virtual avatar. Players have a limited time to destroy each target before it "times-out" and disappears. If the target times-out then no points are awarded to the player for that target. To provide a visual cue of time remaining, each target gradually becomes more transparent and then disappears. This motivates the players to be as fast as possible. The three panels in the top row of FIG. 1 show a time series of screenshots as the target becomes progressively more transparent. The three panels in the bottom row of FIG. 1 show examples of three different target sizes. In some embodiments, the target presentation duration is titrated according to performance: the duration is decreased (it becomes transparent more quickly) on the next trial after a target is destroyed and the duration is increased (it becomes transparent more slowly) on the next trial after a target time-out. In some embodiments, target size is varied from one round of the task to the next, and target duration is titrated separately for each target size. In some embodiments, different target sizes are interleaved within each round of play, and target duration is titrated separately for each target size. In other embodiments the target size is titrated within each round of play: target size is decreased on the next trial after a target is destroyed and the target size is increased on the next trial after a target time-out. In some embodiments target duration is constant during each round, target duration is varied from one round of the task to the next, and target size is titrated during each round. In some embodiments, different target durations are interleaved within each round of play, and target size is titrated separately for each target duration. In some embodiments, both different target durations and different target sizes are interleaved within each round of play, and both target size and target duration are titrated from one trial to the next, based on whether or not the player destroyed the target. In all of these embodiments of the Adaptive Reflexshot task, players are incentivized to adjust their speed and accuracy, depending on target size and duration, so as to maximize their score.

Input Device Calibration

In some embodiments, the orientation of the player's view of the environment, controlled by the input device, is recorded in Euler angles and sampled at 120 Hz. Other sampling rates can be used instead of 120 Hz; for example sampling rates ranging from 30-240 Hz. Other representations of player orientation and movement can be used instead of Euler angles such as pixels or quaternions. The crosshair, marked in some embodiments with a dot at the center of the screen, corresponds to the direction in which a shot would be fired. When triggered, the shot moves in a straight line pointing away from the player's virtual avatar.

Some embodiments measure the player's physical movements. For example, when the input device is a computer mouse, the orientation data are converted to the corresponding movements of the mouse on the mouse pad in units of centimeters or inches. This requires additional information about the relationship between physical mouse movement and changes in player orientation, which can vary across players due to their hardware and software settings.

Some embodiments record the in-game settings that govern the field of view as well as the mouse sensitivity—the magnitude of a change in orientation that results from a single increment or count from the mouse. Mouse sensitivity can be recorded for the x- and y-axes of motion independently. Additionally, some embodiments record a player's mouse (e.g., hardware, software, or both) settings that determine the number of counts that result for one inch of distance traveled (counts per inch, CPI). Other measures may be used.

In one embodiment, the orientation of the player's avatar in the virtual environment is converted into centimeters of physical mouse movement, for example according to:

1. Mouse sensitivity*0.05=angle increment (degrees turned per count)
2. Total degrees turned/angle increment=counts
3. (counts/CPI)*2.54=physical distance traveled (cm)

The value of 0.05 is an example constant used in the Unity software code to scale mouse counts to degree increments. Other constants, and other formulas, may be used.

A person of skill in the art recognizes that other input devices can be calibrated using similar methods and computations, and that distances can be specified in metric units (e.g., centimeters) or imperial units (e.g., inches).

Movement Parsing

Some embodiments parse the time-series of each player's movements or inputs, acquired by the input device. In such a manner a player's input, e.g. a mouse movement possibly combined with a shot (e.g. indicated by a mouse click), may be converted to a discrete and defined parsed input, which may then have one or more metrics derived from the parsed input. Movements can be recorded as change in orientation (e.g., Euler angles) in the virtual environment of the game. Movement parsing may label each time-point, for example as in-motion or stationary; other labels may be used. Epochs (e.g., periods of time corresponding to a consecutive series of time samples) may be labeled as in-motion after several consecutive samples exceed a velocity threshold. Epochs may be labeled as stationary after several consecutive samples fall below a velocity threshold. The number of consecutive samples used and the values of the thresholds can be determined from a large dataset comprising data from a large number of players. Each successive epoch (e.g., in-motion or stationary) may be different in duration.

Figure 2:
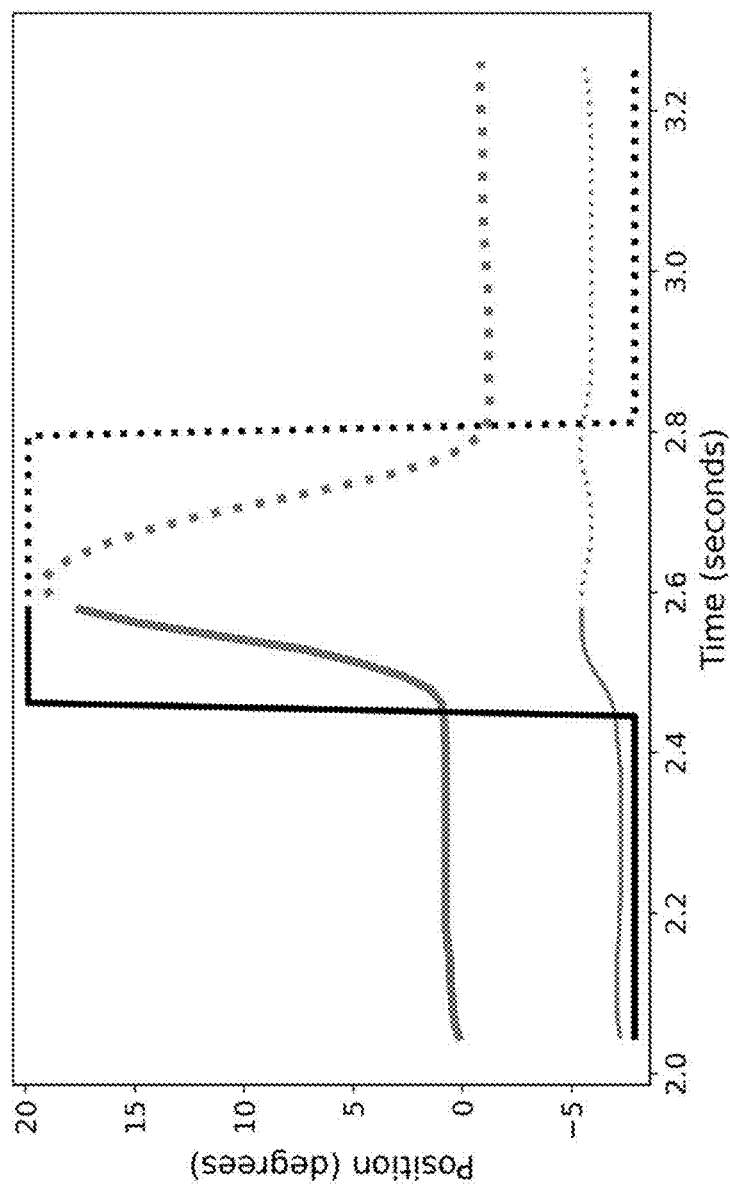
FIG. 2 shows an example of movement parsing utilizing changes in movement direction, according to some embodiments.

Players may change the direction of their movements without significantly slowing their movement speed. For example, this may occur when multiple targets are present in the virtual environment, and a player begins to move towards one and then decides to prioritize a different target without destroying or shooting at the original target. As another example, a player may not reach a target quickly enough, and thus will never fire a shot at that target even though a ballistic movement was initiated in that target's direction. Some embodiments utilize changes in movement direction to parse movements. If the player moves in one direction and then changes to a substantially different direction, then the time-series may be segmented such that an epoch preceding the change in direction is associated with one movement and the epoch following the change in direction is associated with a different movement. Some embodiments detect a change in direction when the angle of the movement velocity changes above a threshold for at least one time sample. Other embodiments detect a change in direction when the angle of the movement velocity changes above a threshold for a plurality of time samples. The number of consecutive samples and the values of the thresholds can be determined from a large dataset comprising data from a large number of players. An example is shown in FIG. 2. The player's orientation is plotted in FIG. 2 in degrees on the y-axis, across time in seconds along the x-axis. The thick and thin lines indicate the x- and y-components, respectively, of the player's orientation. The epoch of time bracketed by the three-sided rectangle shape (missing the bottom) indicates the time over which the player's motion had a speed that was fast enough to be considered in-motion. During the time period shown, the player moved in one direction, and then rapidly changed directions without slowing down. The point at which the direction changed is parsed into a separate movement, which may be termed a parsed input, e.g. a discrete input which may be analyzed by having metrics computed describing it. The solid lines and solid curves correspond to the first of the two movements. The dotted lines and dotted curves correspond to the second of the two movements.

Figure 3:
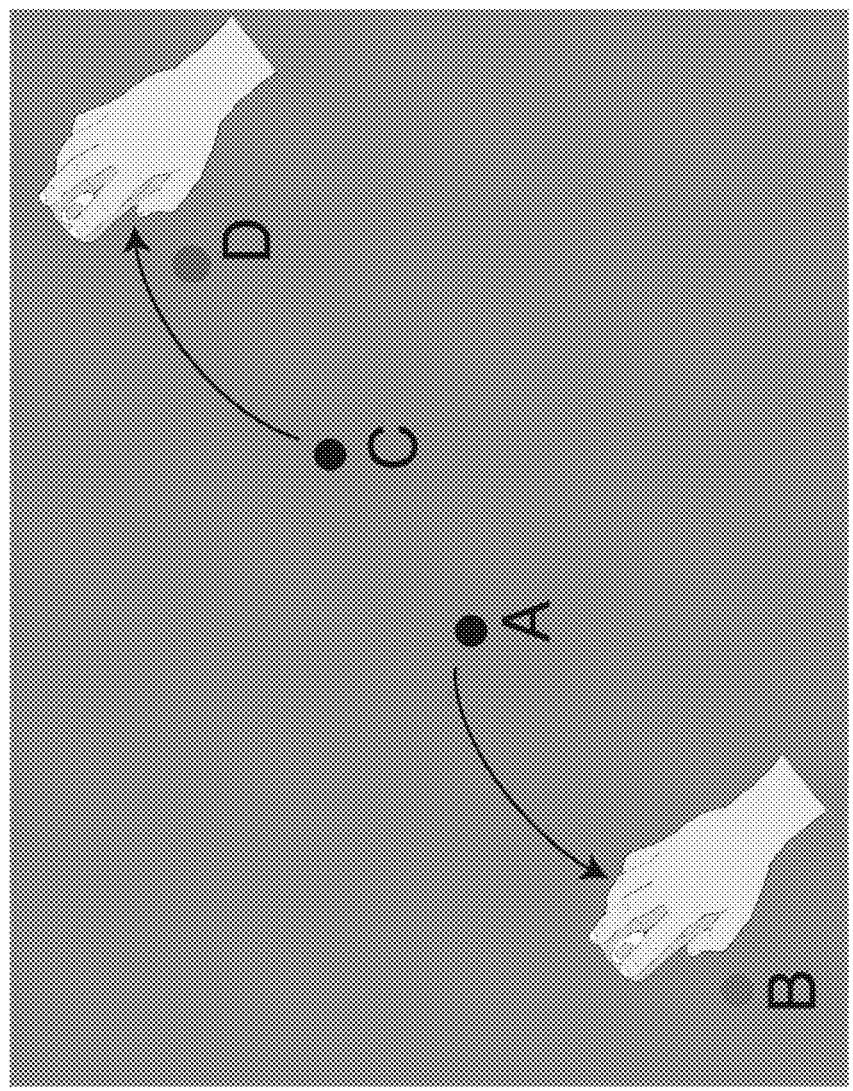
FIG. 3 shows illustrations of movement trajectories, according to some embodiments.

FIG. 3 shows illustrations of movement trajectories, according to some embodiments. A primary movement toward a target is frequently followed by a corrective movement. For instance, the primary movement can be hypermetric, passing beyond the target, with a corrective movement in the opposite direction back toward the target (FIG. 3, C to D). Conversely, the primary movement can instead be hypometric, falling short of the target (FIG. 3, A to B), requiring a corrective movement in the same direction as the primary movement. There are sometimes multiple corrective movements. In some embodiments, a single primary movement can be identified for each target as the largest amplitude movement in the direction of that target (for example, within ±45 degrees). In some embodiments, the different types of movement components (primary versus corrective) can be analyzed separately.

In some embodiments, performance metrics can include the median number corrective movements to hit a target and the proportion of targets for which the player hits the target with N movements (where N is a positive integer).

Some embodiments associate (e.g., automatically, using a computer system as described herein) each of a player's movements with a shot. Players typically make a sequence of movements to destroy a target. To associate a shot with one or more movements, some embodiments first identify the time point at which the shot was fired, and step backwards in time (e.g., asses) from the time at which a shot was fired to identify the movements that were initiated at time points preceding that shot. Each shot may be associated with more than one movement. Each movement may be associated with more than one shot. For example, a player may fire a shot that misses the target during an initial swipe movement, followed by a corrective movement and a shot that destroys the target. In this example, the initial swipe movement may be associated with both shots. Some embodiments associate movements with corresponding targets according to which shots are associated with that movement and which target or targets was or were closest to the associated shot or shots.

Performance metrics in some embodiments can include the proportion of movements for which there is no shot associated with the movement (e.g., if there is no shot between the initiation of one movement and the initiation of the next movement), which reflects the need for players to make multiple movements to destroy any given target. Performance metrics can include the proportion of targets for which a player hits the target with N movements (where N is a positive integer).

Movement Kinematics

Figure 4:
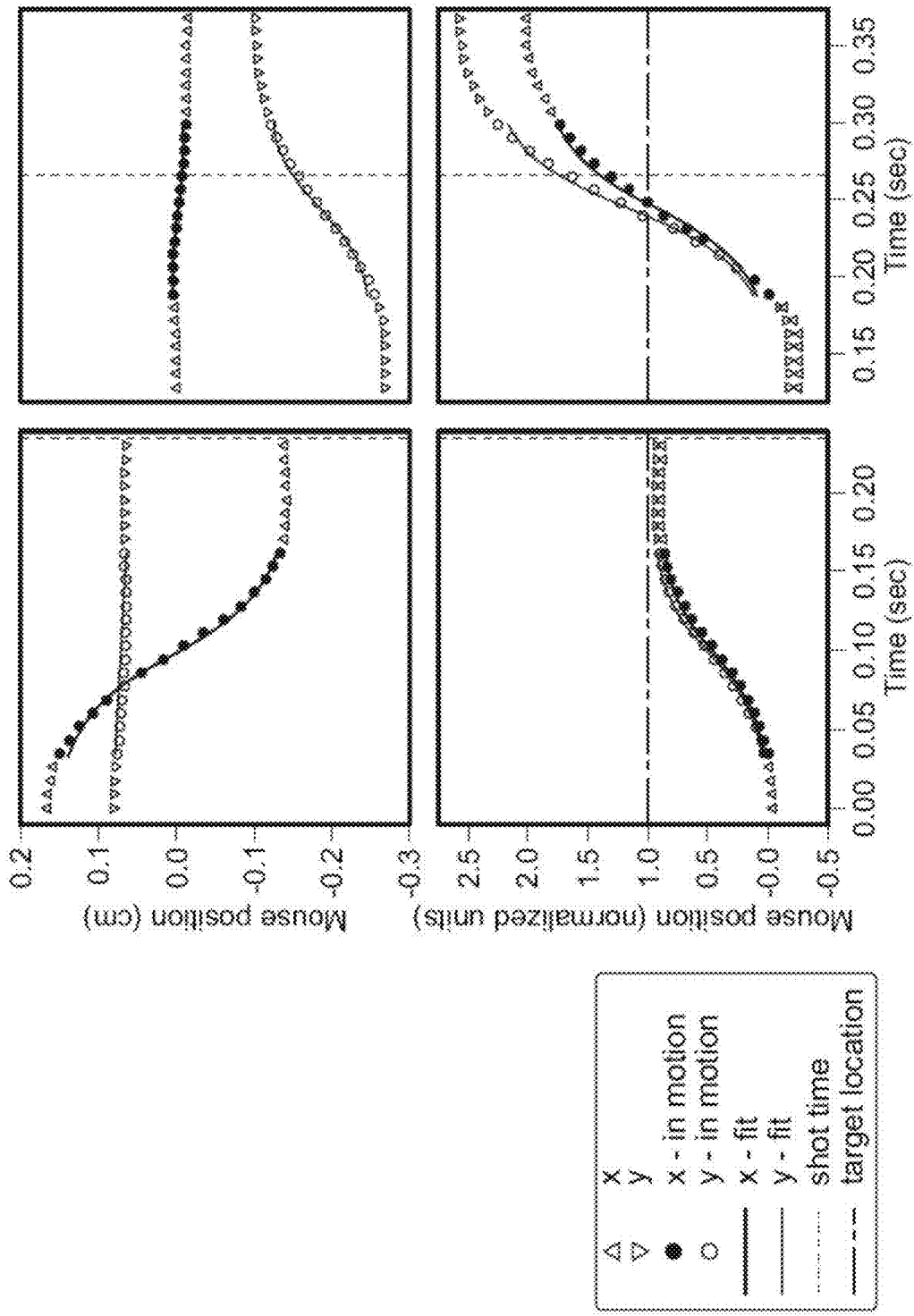
FIG. 4 shows examples of movement trajectories and model fits, according to some embodiments.

Performance metrics in some embodiments can include movement kinematics, e.g. based on player inputs or parsed inputs. Movement kinematics may be measured by fitting parametric functions, curves or lines to a time series of each player's movements or parsed inputs acquired with the input device: e.g. a function, curve or line may be fit to movement measurements, and the parameters defining this function, curve or line may be used as performance metrics. Performance metrics may be based on the parameters defining this function, curve or line. Some embodiments measure as metrics movement amplitude, speed, precision, accuracy, reaction time. For example, player orientation during each period labeled as "in-motion" (e.g., by a movement parsing process) may be fit with a sigmoidal function, for example, according to example Equations 1-3:

$$f(t; a, b, c) = \frac{a}{1 + e^{b}(t - c)} \quad (1)$$

$$x(t) = f(t; p_1, p_3, p_4) \quad (2)$$

$$y(t) = f(t; p_2, p_3, p_4) \quad (3)$$

where Equation 1 defines a sigmoidal function. In this function c, b, and a are the parameters of the sigmoid that determine, respectively, the midpoint (which indicates timing including lift off), the slope (which indicates speed), and the amplitude (which indicates accuracy). The values of x(t) in example Equation 2 represent a model of the horizontal component (rotation about the y-axis) of the movement trajectory for each time sample, where p1 becomes a, p3 becomes b, and p4 becomes c. The values of y(t) in Equation 3 represent a model of the vertical component (rotation about the x-axis) of the movement trajectory for each time sample. FIG. 4 shows examples of movement trajectories and model fits, according to some embodiments. Example illustrations of the model components x(t) and y(t) are shown in FIG. 4. The top row of FIG. 4 shows two example movements in units of centimeters, transformed using the input device (a mouse in this example) calibration. The bottom row of FIG. 4 shows the same two example movements, scaled to normalized units so that 1 corresponds to the target location. The left column of FIG. 4 shows an example of a flick-and-land. The shot (vertical dashed line) occurs after the movement ends and the movement lands at the target location (horizontal dash-dotted line). The right column of FIG. 4 shows an example of a swipe. The shot (vertical dashed line) occurs during the middle of the movement and the movement lands well past the target location (horizontal dash-dotted line). In this figure, the time series of x- and y-mouse positions from each trial were normalized, e.g., divided by the x- and y-components of target location, respectively. The values of the parameters ($p_1$, $p_2$, $p_3$, $p_4$) were fit to each individual movement trajectory using the Levenberg-Marquardt algorithm. The time series of the player's mouse positions was parsed into epochs corresponding to the period of time of the movement, the period of time preceding the movement, and the period of time following the movement. The circles in FIG. 4 represent samples of the player's movement trajectory. The triangles and upside-down triangles in FIG. 4 represent samples of the player's mouse position before and after the movement. The curves in FIG. 4 represent models of the movement trajectories, as expressed by Equations 1, 2, and 3, with best-fit values for the parameters. In Equations 2 and 3, the x- and y-components of movement are fit with shared parameters $p_3$ and $p_4$. In other embodiments, the x- and y-components are fit independently with no shared parameters, such that midpoint and speed of the x- and y-components can be different from one another.

In some embodiments, speed, precision, accuracy, and reaction time are then based on or calculated from the best-fit parameter values, for example:

1. Speed (e.g., cm/sec or deg/sec): peak speed at the midpoint of the movement, e.g. the movement of the user-controlled game entity such as the weapon, aiming point, or crosshairs.
2. Accuracy (e.g., % distance of the landing point of the movement to the target): which may be described as distance (e.g. spatial error) between the landing location of the movement and the center of the target. For example if a 20 degree movement is required but the player moves 18 degrees then the accuracy is −10% (10% short of the target) whereas if the player moves 22 degrees then the accuracy is +10% (10% past the target). Distance may be measured in e.g. an angle, pixels, a virtual distance having meaning in the virtual environment of the game, actual distance of an input controller to the distance of that controller corresponding to a target (e.g., mouse position on the mouse pad), or other measures.
3. Reaction time (e.g., sec): time interval between when the target appeared and the initiation of the movement (e.g., when the movement reached 5% of its endpoint).

For example, movement speed and accuracy of each parsed movement can be quantified according to, for example, example Equations 4-10:

$$\text{Speed} = \frac{a_m}{f'(p_4; a_m, p_3, p_4)} \quad (4)$$

$$\text{Accuracy} = \frac{e^T u}{a_t} \quad (5)$$

$$f'(t; a, b, c) = bc[f(t; 1, b, c)][1 - f(t, 1, b, c)] \quad (6)$$

$$a_m = \sqrt{(p_1)^2 + (p_2)^2} \quad (7)$$

$$a_t = \sqrt{(x_t)^2 + (y_t)^2} \quad (8)$$

$$e = (p_1 - x_t, p_2 - y_t) \quad (9)$$

$$u = \frac{(x_t, y_t)}{\|(x_t, y_t)\|} \quad (10)$$

The position of the player (e.g. the position of the crosshairs) at time t is represented as $x_t$ and $y_t$. The function f'(t) is the derivative of the sigmoidal function (Equation 6). The value of $a_m$ represents the amplitude of the movement (Equation 7) and the value of $a_t$ represents the distance to the target location (Equation 8). The vector e represents the movement error (Equation 9) and the vector u represents a unit vector in the direction of the target location (Equation 10). In some embodiments, accuracy is calibrated to have units of cm and/or movement speed is calibrated to have units of cm/sec. In some embodiments, accuracy is calibrated to have units of deg (e.g., angular degrees of rotation in the virtual environment of the game) and/or movement speed is calibrated to have units of deg/sec.

Other units, and other ways of calculating speed, accuracy, and reaction time, may be used. Speed, accuracy, and reaction time may be measured based on multiple movements, e.g., by computing the average or median across a plurality of movements.

Movement precision may be computed as 1 divided by movement variability. Movement variability may be computed as the standard deviation (across a plurality of movements) of movement landing points. Movement variability may instead be computed as the median (across a plurality of movements) of the absolute value of the spatial error (e.g., distance between the movement landing point and the center of the target). Variability may be expressed in units of % distance and precision may be expressed in units of 1/% distance. Other measures of variability may be used instead of standard deviation and median absolute error and variability may be expressed in units other than percentages (e.g., angular degrees, centimeters).

Error, Precision and Variability

Shot performance or movement kinematics may be used to determine precision, variability, or other measures. In some embodiments multiple measures of shots or movement kinematics (typically for a specific target type)—typically error—may be used to calculate precision or variability. For example, multiple measures of error for a metric (e.g. shot error or movement error) may be taken; variability may be computed for this error; and precision may be determined as 1/variability (thus variability may be 1/precision). Error in some embodiments may be absolute value of error, e.g. absolute value of distance between target center and movement or shot landing point, or other error. Precision (e.g. shot precision, movement precision) may be calculated as or be a measure based on, in one embodiment 1 over (divided by) the variability. A person of skill in the art recognizes that there are a variety of alternative ways to compute shot or movement variability. Some embodiments compute shot variability as the standard deviation of shot locations or movement landings, or standard deviation of accuracy over a plurality of movements or shots. Some embodiments instead compute the median absolute deviation (MAD) of measures such as movement or shot accuracy, or the median of the absolute difference from the median. MAD is a robust measure of variability and may minimize the impact of outliers.

Precision or other measurements may be based on one player's multiple shots, movements or trials, or multiple players multiple shots, movements or trials, e.g. in order to compare one newly seen player to multiple other players in a database, or one player against that same player's prior performance. A database may be created of speed, precision or variability, accuracy or error, reaction time and other performance metrics for players (e.g. past players) for comparison to new or future players.

A variety of measures of variability could be used instead of standard deviation or MAD. Some embodiments compute the square-root of the median squared difference from the median of, e.g. shot accuracy or movement landing accuracy, or of squared movement error, square root of the median of the squared deviation, or other player measures. Embodiments compute shot variability based on shot error, e.g., the distance between each shot location and the target center (rather than the mean or median of the shot locations). Embodiments can compute the mean of the movement or shot errors across a plurality of shots or movements, median of the errors, the square-root of the mean, or of the median, of the squared errors, or the square-root of the median of the squared errors. Embodiments may compute movement variability based on movement error, e.g., the distance between the landing point of each movement and the target center (rather than the mean or median of the movement landing points). Embodiments can compute the mean of the movement errors across a plurality of movements, median of the movement errors, the square-root of the mean of the squared movement errors, or the square-root of the median of the squared movement errors.

Swipiness

Performance metrics in some embodiments can include swipiness, e.g. based on player inputs or parsed inputs. To characterize the degree to which each ballistic movement or parsed movement resembled a swipe (shooting on the fly) versus a flick-and-land (slowing down and stopping before firing) movement, some embodiments compare the time of each shot with the time of the midpoint of the corresponding ballistic movement. An ideal swipe corresponds to firing a shot at the midpoint of a movement, e.g., the time point with maximum speed. An ideal flick-and-land corresponds to firing a shot only after the movement has ended, after the midpoint of the movement. Some embodiments compute swipiness as a ratio of the time of the shot and the time of the midpoint of the movement (e.g., $p_4$ from Equations 2 and 3 in one embodiment), divided by 2. This results in a "swipiness" value of 0.5 (example arbitrary units) for an ideal swipe, and a "swipiness" value more than or equal to 1 for an ideal flick-and-land. For such embodiments, there is no swipiness value computed for a movement with no associated shot, e.g., if there is no shot between the initiation of one movement and the initiation of the next movement. Swipiness is a granular measure of shot speed as it relates to the movement trajectory, with lower swipiness indicating that the firing of a shot occurred earlier in the trajectory.

Performance metrics in some embodiments can include the proportion of movements for which there is no shot associated with the movement. The lack of a swipiness value may indicate that a movement is not associated with a shot. Moreover, across trials within a certain context or task, the number of movements with no swipiness value may reflect the need for players to make multiple movements to destroy any given target.

Shot Performance

Embodiments may measure speed, accuracy, or precision of shot performance; other values based on shot performance may be used in different embodiments. Some embodiments operationalize or calculate speed and precision according to the first shot fired at each target. For example, speed can be computed by or be a measure based on: 1) determining the elapsed time between target spawn or appearance and the first shot fired (e.g. an input to fire a shot received from a game controller), separately for each target; 2) computing the mean or median elapsed time for this spawn-shot time across a plurality of targets; and 3) computing 1 divided by that mean or median elapsed time. Likewise, precision can be computed by: 1) computing the shot error of the first shot that was fired at each target (e.g., the distance between the landing point of the shot in the game and the center of the target); 2) computing the mean or median of the absolute value of the shot error across a plurality of targets; and 3) computing 1 divided by that mean or median shot error. Other methods of calculating shot speed, precision or variability, may be used for a plurality of shots.

Distance may be measured at the time a shot is taken. A shot being taken may include that a player provides input to an input device such as a mouse or game controller indicating that the player wants to fire a virtual weapon (e.g. rifle) at a target displayed in a game. Distance may be measured between the landing point of the virtual shot in the game (optionally taking into account bullet drop due to simulated gravity) and the center of the target.

Figure 5:
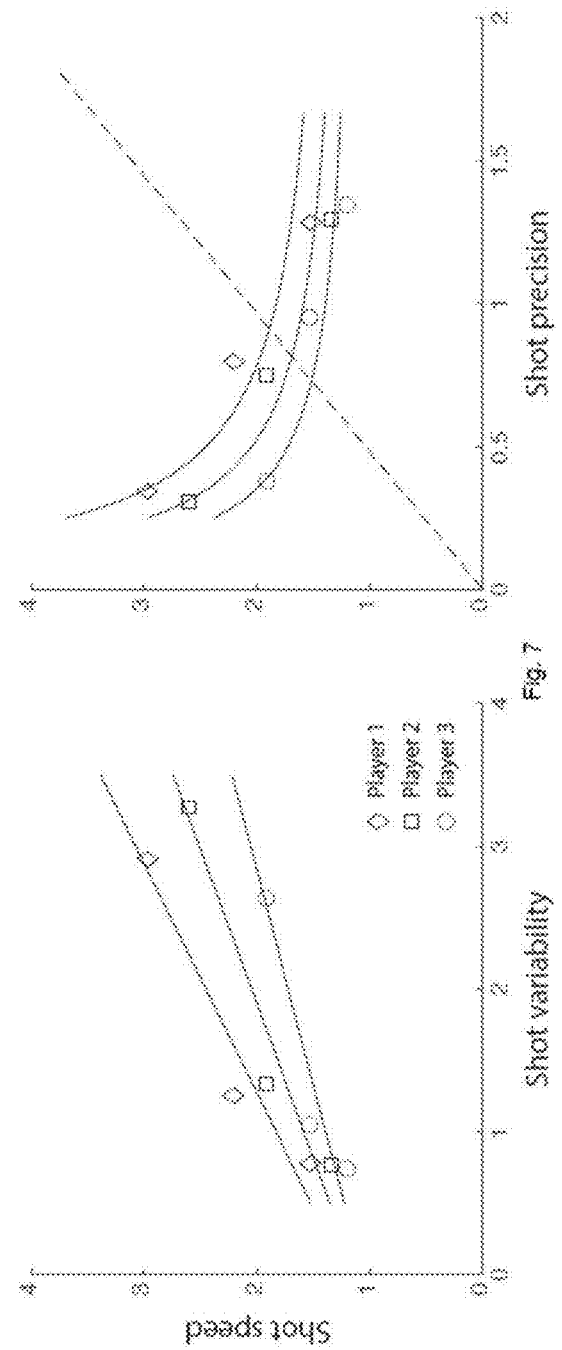
FIG. 5 shows examples of shot speed, shot variability and shot precision, according to some embodiments.

FIG. 5 shows an example of shot performance, utilizing time between target spawn and the first shot fired and shot variability of the first shot that was fired, for a number of targets, according to some embodiments. In FIG. 5 the Y axis represents speed, and the X axes represent variability (left panel) and (right panel) precision, respectively. In FIG. 5 shot speed and shot variability are analyzed, but the method described with respect to FIG. 5 may be used for other performance metrics such as movement kinematics performance metrics. FIG. 5 illustrates an example of speed-accuracy tradeoff curves for three players (other numbers of players may be used), and the dashed line in the right side of FIG. 5 illustrates an example of an axis of skill for, e.g., flicking. In some embodiments, the intersection of individual curves with the diagonal, which may be a performance scale, indicates a flicking skill performance metric. In the example of FIG. 5, the player represented by the diamond-shaped plot symbols has the best flicking skill and the player represented by the circular plot symbols has the worst skill. In other embodiments, there are alternatives for defining the axis of skill, and skill for tasks other than flicking may be used.

Data Post-Processing

Data post-processing may be performed, e.g. after obtaining data from real players, entities, games or gamified tasks or computer games and, e.g., prior to using the data to evaluate entities for cheat detection, to enter into a database, or for a performance metric, motor acuity or skill. Some embodiments apply one or more steps of post-processing to movement kinematic metrics (e.g. speed, precision, accuracy, reaction time, and swipiness) or shot performance metrics to remove outliers and/or to decorrelate the values. Some embodiments apply an upper and lower band threshold to remove outliers (e.g. presumed to be failures in the trial parsing or sigmoid fits) from the movement kinematic metrics. For example, the lower band threshold can be 0 and the upper band threshold can be the 95th percentile. In some embodiments, movements are pruned (e.g. ignored from further analysis) if the sigmoid fits are poor, for example with an r-squared (coefficient of determination) value less than 0.5.

In some embodiments, each accuracy value is multiplied by 100, to convert from proportion to percent of the distance to the target. Some embodiments subtract 100 from each accuracy value such that hypometric movements (movements ending short from the target) have negative values and hypermetric movements (movements ending past the target) have positive values.

Some embodiments compute a z-score (a statistical measurement of distance from a mean or average) for each movement kinematic metric across players. Similar processing may be used for other player data, such as shot performance metrics.

An embodiment may use residual correlations after z-scoring the movement kinematic performance metrics or other performance metrics across players and regressing out mouse sensitivity from the movement kinematic performance metrics or other performance metrics. Mouse sensitivity may be correlated with movement reaction time, movement speed, swipiness and other performance metrics. The correlation may be removed by the regression procedure. Embodiments may use correlations, before and after z-scoring and regressing out mouse sensitivity, respectively, for primary movements and corrective movements.

An example regression operation includes Equations 11 through to 13 in order. Firstly, the pseudo-inverse of the mouse sensitivity array $a^{\#}$ may be calculated and multiplied by the matrix of z-scored kinematic metrics Y to produce the estimate X:

$$\hat{x} = a^{\#} Y \quad (11)$$

Subsequently, an embodiment may compute the estimate $\hat{Y}$ by multiplying $\hat{x}$ with the z-scored mouse sensitivity array A:

$$\hat{Y} = A\hat{x} \quad (12)$$

where subtracting $\hat{Y}$ from y gives the residuals (E) of the kinematic performance matrix:

$$E = Y - \hat{Y} \quad (13)$$

Density Estimation

The collection or database of real human performance metrics (e.g. based on inputs) may have a statistical distribution, or probability density function, calculated for it; cheat detection may involve comparing a newly seen set of one or more inputs (typically of the same metric or set of metrics as used for the distribution), or metrics based on the inputs, to the distribution or function, to produce an output of a probability for the newly seen inputs. Comparing one or more inputs from an entity to data related to inputs from prior human players may include comparing performance or other metrics based on the entity's inputs to metrics based on inputs from prior human players, possibly by comparing a statistical distribution of metrics from an entity to those of a database of human players, or by comparing the performance metrics of an entity to a statistical distribution based on such a database. For example, a number of samples of a shot speed metric, each based on a real human input, may be used to create a probability distribution measuring, for a newly seen shot speed metric, the probability of observing the specific value, e.g. the probability that the shot speed metric is generated by a human player (e.g., without assistance from a bot). The produced probability distribution may describe the probability that any point in the distribution belongs to or is observed in the distribution, or the commonality that any point in the distribution has, which corresponds to the likelihood that such a point is that of a real human.

Various methods of comparing a newly seen input to a database of past real human inputs or performance metrics may be used. For example, a probability density may be created: for each instance or data item of a past performance metric, a probability may be created, representing the probability that a given newly seen data item will be equal to or in a given range of that instance.

One embodiment may create a histogram from each datapoint of past human performance metrics, and normalize each bar, count or bin, so that all the bars, counts or bins sum to one. A newly seen metric based on an input may be assigned to a bin, and the probability of that metric on a 0-1 scale is the magnitude or count of that bin.

Another embodiment may use a Gaussian distribution, or another method such as machine learning, to use an input set of past human performance metrics to approximate a probability density. In the case of each past human performance metric being multivariate (e.g. each point of a sample being a vector of different metrics), a kernel density function may be used.

Some embodiments approximate the multivariate distribution of performance metrics as a Gaussian (e.g., normal) distribution. The mean and covariance of the distribution may be estimated from collected information, such as a database of human performance metrics. A person of skill in the art recognizes that a variety of robust methods can be used in estimating mean and covariance. For example, the median may be used as a robust estimate of the mean and the median absolute deviation may be used as a robust estimate of the standard deviation. Optionally, principal components analysis (e.g., singular value decomposition) can be used to decorrelate or circularize the distribution so as to simplify subsequent processing steps and, optionally, to reduce the dimensionality of the distribution.

Some embodiments employ methods for probability density estimation to characterize the multivariate distribution of the collection of real human performance metrics. Such density estimation methods are designed to address the challenge of estimating the underlying distribution of a dataset, especially in cases where the dataset is complex, high dimensional or limited in size. Density estimation methods that may be used include kernel density estimation, Gaussian mixture models, and non-parametric Bayesian methods, among others.

Kernel density estimation may be used which involves using a kernel function to assign a probability density value to each data point in the dataset. The resulting density values are then averaged to obtain a smooth estimate of the underlying probability density function. The choice of kernel function may depend on the shape of the data distribution and the level of smoothing required. Example kernel functions that may be used include the Gaussian kernel, Epanechnikov kernel, and the triangular kernel, and other functions.

Gaussian mixture models may be used which approximate the underlying probability density function as a mixture of several Gaussian distributions. The parameters of each Gaussian component, such as the mean and covariance, are estimated from the data. These parameters can be estimated from the data using an optimization algorithm such as the Expectation-Maximization (EM) algorithm.

Non-parametric Bayesian methods may be used which estimate the probability density function without making any assumptions about the functional form of the distribution. This approach may be useful when the data distribution is unknown or highly variable. An example of a non-parametric Bayesian methods is the Dirichlet process mixture model, which models the data distribution as a mixture of a large number of Gaussian distributions. The number of Gaussian components, as well as their parameters such as means and covariances, may be estimated from the data. The mixing proportions of the Gaussian components may be determined by a Dirichlet process, which is a probability distribution over probability distributions. The data points may be assigned to different clusters based on the mixture weights. The number of clusters may be determined automatically from the data.

Cheat Detection

Some embodiments detect cheating by comparing one or more inputs from a new entity to be evaluated (or metrics based on those inputs) to data related to inputs to a computer game from prior human players (or to metrics based on those prior inputs); based on this comparing it may be determined if the entity is a human player or a cheater. For example, determining if the entity is a human or a cheater may be performed by comparing performance metrics based on inputs, for example by using a statistical distribution. This may be done by computing the probability or likelihood of the performance metrics from a new player (which may be for example an executing computer program, or bot, or a genuine non-cheating human player) with respect to a database of previously collected human performance metrics, e.g. with respect to the probability density of validated database of human performance metrics. Various performance metrics may be used, such as those described herein, or other metrics.

An embodiment may convert a newly seen set of one or more inputs (e.g. mouse movements, shots, or parsed inputs or parsed movements) to one or metrics or performance metrics. Some metrics, such as movement speed, movement accuracy or movement reaction time, may be based on one movement or parsed movement; other metrics, such as movement variability or movement precision, may be based on multiple movements. E.g. each movement or parsed movement may be converted to a metric such as shot speed (univariate) or multiple metrics such as shot speed and shot accuracy (multivariate, e.g. represented as a vector, e.g. an ordered list of numbers). Each sample's metric may be compared to a distribution (e.g. a statistical distribution) or function of those same metrics or performance metrics (e.g., created based on prior real human samples), to produce an output of a probability. The probability may be that the newly seen inputs fall inside the source samples for the distribution, which may be deemed to be the probability that the newly seen input is that of a real human: if the newly seen metric has a low probability, and thus a low likelihood of occurrence, in the set of prior metrics, it is less likely to be that of a human.

The comparison of the metric of the newly seen sample to the distribution depends on the type of distribution: a metric compared to a histogram is simply assigned to a bin which produces a probability; a metric compared to a Gaussian distribution is input to an appropriate function which produces a probability; a new metric or metric vector may be compared to a kernel density function using a lookup table.

Multiple (univariate or multivariate) samples from the newly seen entity may have their probabilities combined, e.g. multiplied together, to produce a likelihood from multiple samples from a new entity. The resulting probability may be deemed to be the probability that the entity is a real human; a low probability indicates a likely cheater or bot.

A series of probabilities from a new entity may be combined to produce a combined probability. The input from a new player may be a set of inputs, e.g. a set or number of samples of inputs. Each input may be processed as described elsewhere herein (e.g. calibrated, parsed, converted to a performance metric, etc.). Given a set of samples of performance metrics from a new player for each of a series of targets, $X=\{x1, x2, \ldots, xn\}$, the likelihood that those performance metrics correspond to human input, in one embodiment, may be computed as the product of the probabilities of observing each sample. For a continuous probability distribution (and for some other distributions, e.g. a discrete histogram), an example likelihood function for N sample metrics for an entity ($X_i$ sampled from 1 to N) is given by example Equation 14:

$$L(\theta)=P(X|\theta)=\Pi f(x_i|\theta) \quad (14)$$

where $L(\theta)$ is the resulting probability; $\theta$ is the probability distribution based on known human players; X is the collection of sample performance metrics such that xi is the ith sample; $P(X|\theta)$ expresses this as the probability of X given $\theta$; $f(x_i|\theta)$ is the probability density function of the distribution (e.g. based on the collection or database of real human inputs or performance metrics), evaluated at sample metric xi (univariate or multivariate; i=1 to N, N being the number of sample metrics used for this player or entity for comparison) given parameters $\theta$ that characterize the probability density; $\Pi$ expresses that each comparison resulting in a probability is multiplied. For some embodiments, the new player is identified as a cheater if the likelihood is smaller than a threshold value. The likelihood that those performance metrics correspond to cheater input may be 1 minus the likelihood the metrics correspond to human input.

For example, the samples or performance metric values may be the reaction times of the new player for each of a number of targets. Those reaction times may form a set of samples and may be compared with a distribution of human reaction times. Reaction times that are extremely short (in the tail of the distribution of human reaction times) are unlikely to be from human inputs and more likely to be inputs from an aim bot. If a large proportion of the reaction times are extremely short, then the new player is almost certainly cheating.

More than one performance metric may be analyzed at once. In some embodiments each sample (e.g. of multiple samples for a newly seen player) is a vector (e.g., an ordered series of numbers) of performance metrics corresponding to the same input or parsed movement, and the likelihood is computed with respect to a multivariate distribution of human performance. A sample may for example include a vector of performance metrics such as movement amplitude, movement speed, accuracy of movement landing point, movement reaction time, movement variability or precision, swipiness, shot time or speed, shot variability or precision, and number of corrective movements, or another set of metrics, each describing the same movement input. In the case that multiple different types of performance metrics make up each sample, like performance metrics from the newly seen player in each sample are compared with like performance metrics in the database of real human player data, e.g. reaction time from the new player is compared with reaction time from the real human database.

The analysis of performance metrics and comparison with a real human database may be done separately for each of a plurality of different conditions or circumstances to identify a new player as a cheater. For example, a comparison may be done separately for different target sizes or target distances.

Some embodiments detect cheating by computing the Mahalanobis distance between the performance metrics of a new player (e.g. multiple vectors or sets of performance metrics) and previously collected sample metrics, e.g. the probability density of the validated database of human performance metrics. The Mahalanobis distance is a measure of the distance between two points in a multi-dimensional space that takes into account the correlations between the dimensions. Unlike Euclidean distance, which assumes that all dimensions are equally important and independent, the Mahalanobis distance accounts for correlations between dimensions, giving a more meaningful representation of distance in a multi-dimensional space. The Mahalanobis distance between a point represented by vector x and a multivariate probability density function with mean μ and covariance matrix Σ, is defined according to example Equation 15:

$$d(x,\mu)=\sqrt{(x-\mu)^T \Sigma^{-1} (x-\mu)} \quad (15)$$

where T represents the transpose operation, and $\Sigma^{\wedge}(-1)$ is the inverse of the covariance matrix. For some embodiments, the new player is identified as a cheater if more than a threshold proportion of the Mahalanobis distances (e.g. each distance produced by a comparison of a set of performance data, e.g. a vector or metrics, from the new player with a database) are larger than a threshold value. Other distance measures, such as Euclidian distance, may be used.

A person of skill in the art will recognize that various other methods or computations can be used with embodiments of the invention to compare the performance metrics from a new entity or player with the probability density of the validated database of human performance metrics. Examples of such methods include:

1. Kullback-Leibler divergence (KL divergence): KL divergence is a measure of the difference between two probability distributions. It measures the amount of information lost when approximating one distribution with another. KL divergence can be used to compare the fit of a data sample with a probability density.
2. Wasserstein distance (Earth Mover's Distance): The Wasserstein distance is a measure of the distance between two probability distributions in terms of the amount of "mass" that must be moved to transform one distribution into the other. It provides a way to compare the similarity of a data sample with a probability density.
3. Bures Distance: The Bures distance may be used to quantify the dissimilarity between symmetric positive definite matrices, such as covariance matrices. When considering zero-mean multivariate Gaussian distributions, the Bures distance provides a way to compare these distributions in terms of their covariance matrices. The Bures distance provides a measure of the work required to "reshape" one pile of dirt with elliptical volume into another. The Bures distance may be computed using the singular value decomposition.
4. Energy distance: The Energy distance is a non-parametric distance, used in various fields, including statistics and machine learning. The Energy distance considers all possible pairwise differences of data points within and between distributions, and computes an average between-distribution similarity term and within-distribution similarity terms. By subtracting the within-distribution similarity terms from the average between-distribution similarity, the Energy distance captures the discrepancy between the two distributions, considering both the location and spread of the data.
5. Anderson-Darling test: The Anderson-Darling test is a statistical test for assessing the fit of a sample to a theoretical distribution. The test statistically measures the difference between the cumulative distribution function of a data sample and a cumulative distribution function.
6. Kolmogorov-Smirnov test: The Kolmogorov-Smirnov test is a non-parametric test for comparing the fit of a sample to a theoretical distribution. The test statistically measures the maximum difference between the empirical cumulative distribution function of the data sample and a cumulative distribution function.
7. Chi-squared test: The chi-squared test is a statistical test for assessing the goodness of fit of a data sample to a probability density. The test statistically measures the difference between the observed frequencies in a sample and the expected frequencies, given the probability density.

Some embodiments can combine two or more of these methods or computations to compare the performance metrics from the new player with the probability density of the validated database of human performance metrics. For example, if the difference, or distance, measured by one of these or other measures, between a performance metric or performance metric vector, and that of a database of real players, is more of a threshold, the entity may be deemed a cheater.

Figure 6:
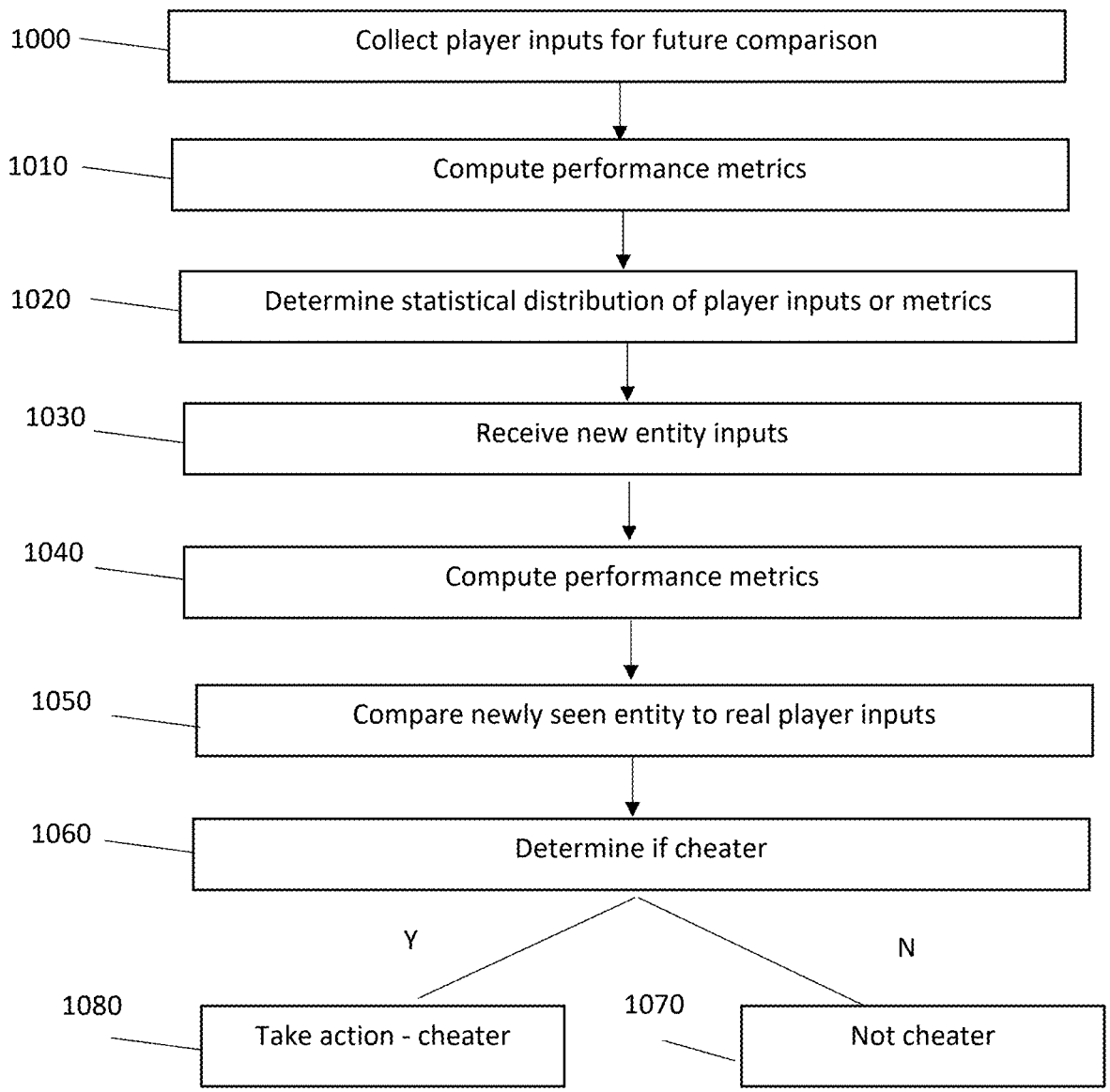
FIG. 6 is a flowchart of a method according to embodiments of the invention.

FIG. 6 is a flowchart of a method according to embodiments of the invention. The operations of FIG. 6 may be performed using systems such as in FIGS. 8 and 9, but may be used with other equipment. While an exemplary method is depicted for illustrative purposes in the flowchart of FIG. 6, it will be appreciated by those skilled in the art that features and operations from this procedure may be selectively combined with features and operations from alternative embodiments of the invention without departing from the remit of the disclosure. Further, while certain features and operations are expressly included in the flowchart of FIG. 6, it will be appreciated by those skilled in the art that not all depicted features and operations are mandatory elements, and that different embodiments may omit certain features or operations without departing from the remit of the disclosure. Accordingly, embodiments including combinations of the features and operations recited in FIG. 6 are expressly within the remit of the disclosure and do not constitute an intermediate generalization of the same.

In operation 1000, inputs may be acquired or received from each of a plurality of real human players via an input device such as a mouse or game controller. Data preprocessing may be performed; for example for each player movements may be divided or parsed into individual parsed movements. In some embodiments the inputs are collected using a particular input device: Since the distribution of performance metrics may be different for different input devices, in one embodiment a database of performance metrics is collected using the same type of input device (e.g. a mouse) across different inputs, and the performance metrics from the new entity is acquired with the same type of input device. The different devices may be calibrated to provide the same data with the same input, as the distribution of performance metrics may be different for a player, e.g., when using a mouse with different mouse sensitivities. Movement parsing may be performed.

In operation 1010, performance metrics may be calculated or analyzed for each real human player. For example one set of one or more metrics may be calculated for each movement or parsed movement. An embodiment may convert each of the inputs (e.g. mouse movements or parsed movements) to one or more metric per movement. E.g. each movement may be converted to a metric such as movement speed (univariate) or multiple metrics such as movement speed and movement accuracy (multivariate, e.g. represented as a vector, e.g. an ordered list of numbers). In one embodiment, a metric vector may be produced for each parsed movement. In such a manner an embodiment may acquire and analyze a set (e.g., a validated database) of past performance metrics from human players. Optionally post processing may be performed; e.g. outliers may be removed from the metrics. Such a database may include many measurements, typically for many different real players, each having multiple associated data points in the database, of for example movement kinematics, movement amplitude, movement speed, accuracy of movement landing point, movement reaction time, reaction time between target appearance and initiation of a movement, and swipiness. In some embodiments, a metric vector may be produced for each shot, e.g., comprising shot time or shot speed and shot error. In some embodiments, a metric vector may include both movement kinematics performance metrics and shot performance metrics. In some embodiments, a metric vector may be produced from a plurality of movements and/or shots, e.g., comprising movement variability or precision, shot variability or precision, motor acuity, speed-accuracy trade-off, proportion of targets for which the player hits the target, proportion of movements for which there is no shot, number corrective movements to hit a target, and number of shots to hit a target. While specific metrics are described in groups, different embodiments may use one or more metrics described in different combinations.

In operation 1020 statistical or machine learning analysis methods such as density estimation, pattern recognition, and pattern classification may be performed to characterize the multivariate distribution of human performance metrics from a number of human players. A statistical distribution, or probability density function, may be calculated for the metrics computed or created in operation 1010.

In operation 1030 movement inputs may be received or acquired from a new entity or player, via the same type of input device that was used to acquire the validated database of human performance metrics. The entity may be a real human, or may be identified as or logged on as a real human, but in the case of a cheater may be providing input using a bot to attempt to mimic high-performance human input. Data preprocessing such as movement parsing and input device calibration may be performed.

In operation 1040, the newly seen entity's movement inputs have performance metrics calculated, typically the same performance metrics as those analyzed for real players as in operation 1010. Optionally post-processing, such as outlier removal, is performed. The data from the newly seen player need not be from the same game as the data collected from prior human players in operation 1000, but in some embodiments it should be from the same type of input device as used by the prior players. For example, human performance, measured in certain ways, with a mouse is the same (has the same limitations and speed-accuracy tradeoff) for any game, although calibration may need to be performed to compensate for different mouse sensitivity settings.

In operation 1050, the newly seen player's input or metrics may be compared to the database of real human inputs, or of past performance metrics. For example, a statistical or machine learning analysis method may be applied to determine if the performance metrics from the new player are inconsistent with the validated database of human performance metrics. In some embodiments a probability or likelihood that the performance metrics from a new player occur in the database of past human metrics may be determined, or a distance between the new entity's metrics and the past human metrics may be determined.

In operation 1060, it may be determined if the entity is a cheater or not. For example, if the probability determined in operation 1050 is below a threshold, or the distance between the new entity's metrics and those of the database of real humans is above a threshold, the entity may be deemed to be a cheater. In one embodiment, the entity is a human player or a bot providing input, and determining that the entity is a cheater indicates the entity is a bot.

In operation 1070, if the entity is not deemed to be a cheater, e.g. the player is deemed to be a real human, or a real human providing their own input, without the aid of a bot, no corrective action is taken, e.g. the player may be permitted to continue to play.

In operation 1080, if the entity is deemed to be a cheater, e.g. the player logged into or identified by the system under a certain identity, is deemed to be, or have its input provided by, a bot, action may be taken. For example, a process may inform or send an alert to other entities, such as players, game developers or gaming platforms, that the entity (e.g. the player having input provided by a bot) analyzed is a cheater; stop the play of the entity; add the entity's username or screen name to a list of cheaters; remove the entity from a leaderboard or other registry or list of successful players; ban the entity from the game; freeze the account of the entity; and undo effects the entity's actions have had on other entities (e.g. raise the rankings of other players).

Other operations or series of operations may be used.

Validation

Figure 7:
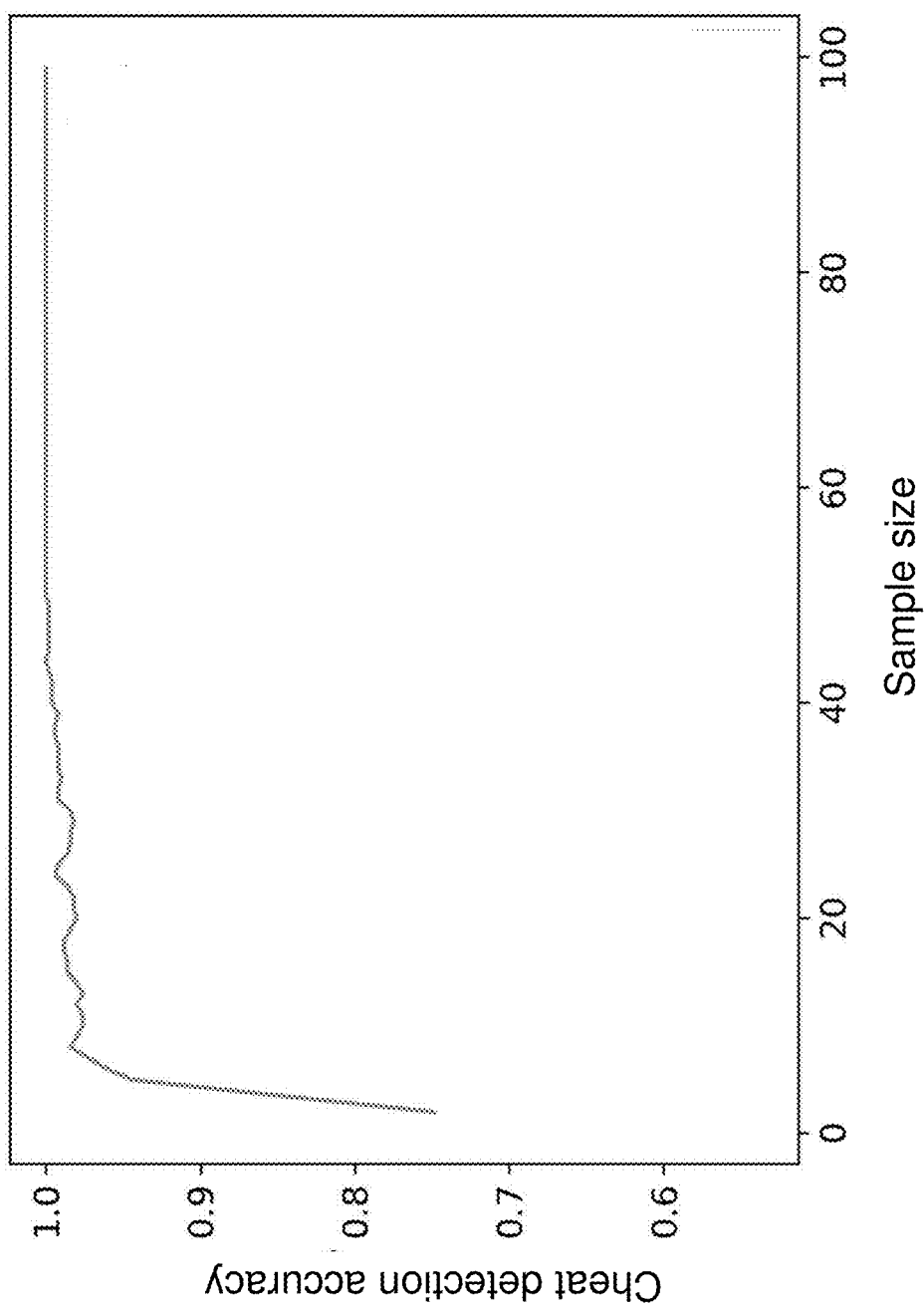
FIG. 7 is an example plot of accuracy of cheat detection according to some embodiments.

To validate some aspects of the disclosed embodiments, data from human Aim Lab system players was analyzed to characterize a distribution of human performance metrics. These human performance metrics were compared with performance metrics from a non-human aim bot. The aim bot did not exhibit the same performance metrics as human players. For example, aim bot reaction times are unrealistically short, movement speeds are unrealistically fast, and precision is unrealistically good. Moreover, the aim bot did not exhibit tradeoffs that are typical of humans. For example, aim bot movement precision did not trade off against movement amplitude. FIG. 7 plots the accuracy of cheat detection (e.g., the proportion of new players that are correctly classified as the aim bot or as a human player) versus sample size (e.g., the number of targets presented). With enough data (e.g., more than 50 targets), one embodiment can distinguish the aim bot from a human player almost perfectly.

Example Apparatus

Figure 8:
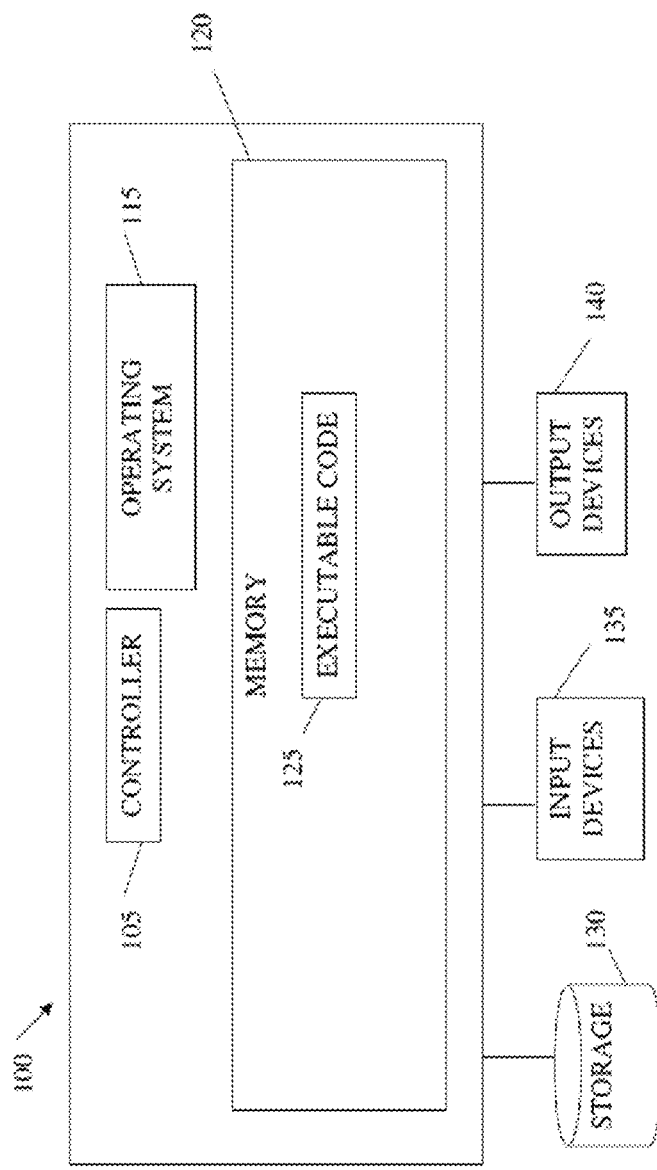
FIG. 8 is an example computer system to carry out methods as discussed herein, according to some embodiments.
Figure 9:
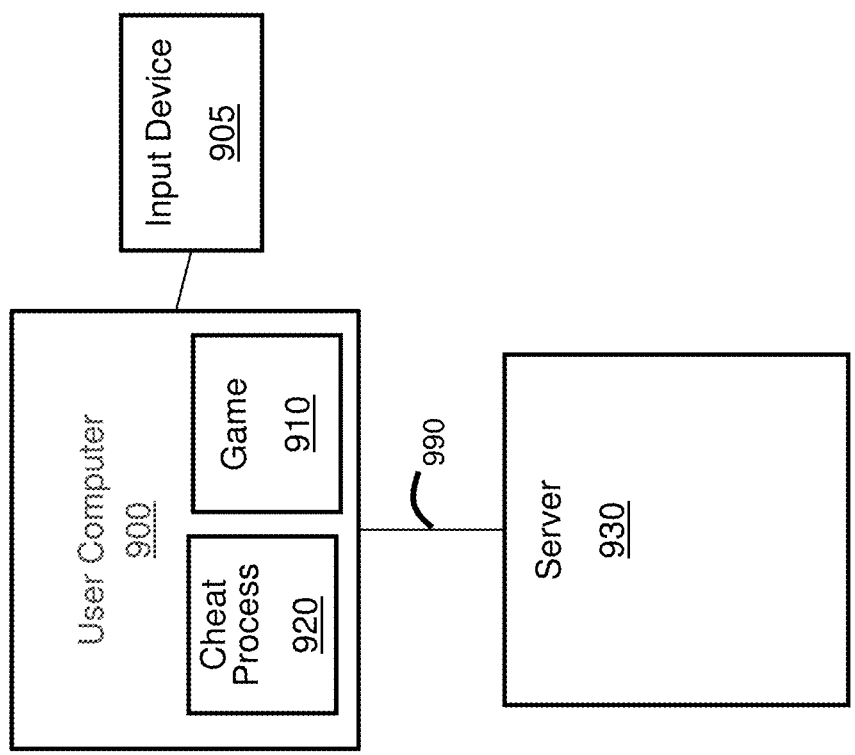
FIG. 9 is an example computer system to carry out methods as discussed herein, according to some embodiments.

In some embodiments, human participants play FPS task(s) remotely using their own gaming set-up, which may be or include computer systems or game consoles (e.g., Microsoft Xbox system or Sony PlayStation system) comprising computer systems, as shown in FIGS. 8 and 9. FIG. 8 depicts a computer according to embodiments of the present invention. The various embodiments and operations discussed herein may be executed by a computing device such as in FIG. 8. For example, user computer 900 (FIG. 9), server 930, cheat process 920, computer game 910 or other processes described herein may be, or be executed by, a computer such as depicted in FIG. 8. Referring to FIG. 8, computing device 100 may include a controller or computer processor 105 that may be, for example, a central processing unit processor (CPU), a chip or any suitable computing device, an operating system 115, a memory 120, a storage 130, input devices 135 and output devices 140 such as a computer display or monitor displaying for example a computer desktop system.

Operating system 115 may be or may include code to perform tasks involving coordination, scheduling, arbitration, or managing operation of computing device 100, for example, scheduling execution of programs. Memory 120 may be or may include, for example, a Random Access Memory (RAM), a read only memory (ROM), a Flash memory, a volatile or non-volatile memory, or other suitable memory units or storage units. Memory 120 may be or may include a plurality of different memory units. Memory 120 may store for example, instructions (e.g. code 125) to carry out a method as disclosed herein, and/or data such as documents, etc.

Executable code 125 may be any application, program, process, task or script. Executable code 125 may be executed by controller 105 possibly under control of operating system 115. For example, executable code 125 may be one or more applications performing methods as disclosed herein. One or more processor(s) 105 may be configured to carry out embodiments of the present invention by for example executing software or code.

Input devices 135 may be or may include game controllers, gyroscope sensors, electroencephalography (EEG) sensors, electromyography (EMG) sensors, a mouse, a gaming input device, a keyboard, a touch screen or touchpad, a mobile phone, tablet computer (e.g. an iPad), or any suitable input device or combination of devices. Output devices 140 may include one or more displays, speakers and/or any other suitable output devices or combination of output devices. Any applicable input/output (I/O) devices may be connected to computing device 100, for example, a wired or wireless network interface card (NIC), a modem, printer, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

FIG. 9 depicts a computer system according to embodiments of the present invention. A user computer 900 may be a desktop, laptop, personal computer (PC), cellular telephone, smartphone, or gaming console or computer (e.g. Xbox, PlayStation, etc.), e.g. accepting user (e.g. gamer) input via an input device 905 (e.g. a mouse, Wii controller, iPad, etc.) to a video or computer game 910 and displaying gaming output (e.g. views such as displayed in FIG. 1), e.g. on a computer monitor or display such as an output device 140 of FIG. 8. Game 910 and its user interface may be displayed by or in conjunction with other software such as an internet browser, the Steam game store, the Epic game store, or other software. User computer 900 may execute a cheat process 920 (e.g. aim bot or trigger bot), and may access the environment of game 910, and provide input to game 910. Cheat process may provide input to game 910 while identified by or registered as a human player allegedly operating game 910. In another embodiment cheat process 920 may be executed on or by computer other than computer 900.

Game 910 may execute all or partly on computer 900 and/or a remote computer such as server 930, which may be, e.g. a computer operated by a game provider company, a cloud computing facility, etc. Computer 900 may provide output such as a game display and may be connected e.g. via one or more networks such as the internet 990 to other computers such as server 930. User computer 900 and/or server 930 may detect cheating or provide other methods as discussed herein. User computer 900, server 930, and other systems may be computers for example including components in system 100 (FIG. 8). While one user computer 900 and one server 930 is shown, other embodiments may use multiple such computers, e.g. connected by a network such as internet 990.

The hardware and settings used by different users may vary. This variation includes different hardware such as the PC, monitor, mouse or other input device and mouse pad, and settings such as display size, field-of-view, viewing distance, chair height or mouse counts per inch (CPI). There can be a wide range of equipment combinations across players. In some embodiments, mouse acceleration is disabled. In some embodiments, mouse movements are sampled at 120 Hz but other sampling rates may be used instead.

In some embodiments, movement trajectories are determined by sampling an input position from an input device, controlled by a person while the person plays the game. The input device can control the player's interaction with the virtual environment of the game, including moving or reorienting the player's avatar and/or one or more actions of the player's avatar (e.g., utilization of a weapon). Examples of input devices (e.g., input device 135 of FIG. 8) include keyboard, mouse, gaming mouse, game console, joystick, accelerometer, gyroscope, pointing device, motion capture, Wii remote controller, eye tracker, computer vision system, or any of a variety of methods, devices, apparatuses, and systems for sensing, measuring or estimating human movement to provide input signals to a computer. For example, the gyroscope in a smart phone or tablet can be used as the input device for gamified tasks that run on those devices. Examples of human movements include hand movements, arm movements, head movements, body movements, and eye movements. Examples of input devices also include brain-computer interface methods, devices, apparatuses, and systems for sensing, measuring or estimating brain activity. Examples of brain-computer interfaces include, but are not limited to, devices that measure electrophysiogical signals (e.g., using EEG, magnetoencephalography (MEG), microelectrodes) and optical signals (e.g., using voltage-sensitive dyes, calcium indicators, intrinsic signals, functional near-infrared spectroscopy, etc.). Examples of brain-computer interfaces also include other neuroimaging techniques (e.g., functional magnetic resonance imaging). Examples of input devices also include methods, devices, apparatuses, or systems for sensing, measuring or estimating physiological data. Physiological data includes, but is not limited to, EEG, EKG, EMG, EOG, pupil size, and biomechanical data relating to breathing and/or respiration. A person of skill in the art recognizes that any such input device or any combination of such input devices could be used. It is also recognized that other methods, devices, apparatuses, or systems for sensing, measuring or estimating human movement or physiological activity could be substituted, including those that have not yet been reduced to practice.

Embodiments may improve cheat detection or player identification technology, for example by detecting advanced or subtle cheat detection methods, such as those using bots or computer programs to mimic human players.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein. Further, while certain operations and features are described with respect to certain embodiments, not all elements and operations are mandatory, and different embodiments may omit certain features.

The invention claimed is:

1. A method of detecting cheating in a computer game, the method comprising:
   receiving a plurality of inputs to a computer game from a plurality of human players;
   receiving a plurality of inputs to the computer game from an entity;
   computing performance metrics based on the plurality of inputs from the plurality of human players;
   computing performance metrics based on the plurality of inputs from the entity;
   characterizing a statistical distribution of the performance metrics from the plurality of human players;
   characterizing a statistical distribution of the performance metrics from the entity;
   comparing the performance metrics from the plurality of inputs from the entity to the performance metrics from the plurality of inputs from the plurality of human players, wherein the comparing comprises comparing the statistical distribution of performance metrics from the entity to the statistical distribution of performance metrics from the plurality of human players; and
   based on the comparing, determining if the entity is a human player or a cheater.

2. The method of claim 1, wherein the performance metrics are selected from the group consisting of: movement kinematics, movement amplitude, movement speed, accuracy of movement landing point, movement reaction time, reaction time between target appearance and initiation of a movement, swipiness, movement variability, movement precision, motor acuity, speed-accuracy trade-off, proportion of movements for which there is no shot, number corrective movements to hit a target, shot performance, shot time, shot speed, shot error, shot variability, shot precision, number of shots to hit a target, and proportion of targets for which the player hits the target.

3. The method of claim 1, wherein the one or more inputs are provided by an input device selected from the group consisting of: computer mouse, keyboard, mobile computing device, mobile telephone, mobile device, and game controller.

4. The method of claim 1, comprising, if it is determined that the entity is a cheater, taking action from the group consisting of: informing other entities that the entity is a cheater; stopping the play of the entity; adding the entity's username to a list of cheaters; removing the entity from a leaderboard; banning the entity from the game; freezing the account of the entity; and undoing effects the entity's actions have had on other entities.

5. The method of claim 1, wherein the entity is a human player, or a bot providing input, and determining that the entity is a cheater indicates the entity is a bot.

6. The method of claim 1, comprising, if it is determined that the entity is a player using a bot, taking action from the group consisting of: informing other entities that the entity is a cheater; stopping the play of the entity; adding the entity's username to a list of cheaters; removing the entity from a leaderboard; banning the entity from the game; freezing the account of the entity; and undoing effects the entity's actions have had on other entities.

7. The method of claim 1, wherein the comparing comprises calculating a likelihood that the statistical distribution of the performance metrics from the entity corresponds to human input represented by the statistical distribution of performance metrics from the plurality of human players; and the entity is determined to be a cheater if the likelihood is below a threshold.

8. The method of claim 1, wherein the comparing comprises calculating a distance between the statistical distribution of the performance metrics from the entity and the statistical distribution of the performance metrics from the plurality of human players; and the entity is determined to be a cheater if the distance is greater than a threshold.

9. The method of claim 1, wherein the comparing comprises a comparison of two probability density functions.

10. The method of claim 1, wherein each statistical distribution is created based on a probability density.

11. The method of claim 1, wherein each statistical distribution is a multivariate distribution.

12. A system for detecting cheating in a computer game, the system comprising:
   a memory; and
   a processor to:
      receive a plurality of inputs to a computer game from a plurality of human players;
      receive a plurality of inputs to the computer game from an entity;
      compute performance metrics based on the plurality of inputs from the plurality of human players;
      compute performance metrics based on the plurality of inputs from the entity;
      characterize a statistical distribution of the performance metrics from the plurality of human players;
      characterize a statistical distribution of the performance metrics from the entity;
      compare the performance metrics from the plurality of inputs from the entity to the performance metrics from the plurality of inputs from the plurality of human players, wherein the comparing comprises comparing the statistical distribution of performance metrics from the entity to the statistical distribution of performance metrics from the plurality of human players; and based on the comparing, determine if the entity is a human player or a cheater.

13. The system of claim 12, wherein the performance metrics are selected from the group consisting of: movement kinematics, movement amplitude, movement speed, accuracy of movement landing point, movement reaction time, reaction time between target appearance and initiation of a movement, swipiness, movement variability, movement precision, motor acuity, speed-accuracy trade-off, proportion of movements for which there is no shot, number corrective movements to hit a target, shot performance, shot time, shot speed, shot error, shot variability, shot precision, number of shots to hit a target, and proportion of targets for which the player hits the target.

14. The system of claim 12, wherein the one or more inputs are provided by an input device selected from the group consisting of: computer mouse, keyboard, mobile computing device, mobile telephone, mobile device, and game controller.

15. The system of claim 12 wherein the processor is to, if it is determined that the entity is a cheater, take action from the group consisting of: informing other entities that the entity is a cheater; stopping the play of the entity; adding the entity's username to a list of cheaters; removing the entity from a leaderboard; banning the entity from the game; freezing the account of the entity; and undoing effects the entity's actions have had on other entities.

16. The system of claim 12, wherein the entity is a human player, or a bot providing input, and determining that the entity is a cheater indicates the entity is a bot.

17. A method of detecting cheating in a computer game, the method comprising:

receiving a plurality of inputs to a computer game from a plurality of human players;

receiving a plurality of inputs to the computer game from an entity;

computing performance metrics based on the plurality of inputs from the plurality of human players;

computing performance metrics based on the plurality of inputs from the entity;

creating a statistical distribution of the performance metrics from the plurality of human players;

creating a statistical distribution of the performance metrics from the entity;

comparing the statistical distribution of performance metrics based on the inputs from the entity to the statistical distribution of performance metrics from the plurality of human players; and based on the comparing, determining if the entity is a human player or a player using a bot.

18. The method of claim 17, wherein the performance metrics are selected from the group consisting of: movement kinematics, movement amplitude, movement speed, accuracy of movement landing point, movement reaction time, reaction time between target appearance and initiation of a movement, swipiness, movement variability, movement precision, motor acuity, speed-accuracy trade-off, proportion of movements for which there is no shot, number corrective movements to hit a target, shot performance, shot time, shot speed, shot error, shot variability, shot precision, number of shots to hit a target, and proportion of targets for which the player hits the target.

19. The method of claim 17, wherein the inputs are provided by an input device selected from the group consisting of: computer mouse, keyboard, mobile computing device, mobile telephone, mobile device, and game controller.

20. The method of claim 17, wherein each statistical distribution is a probability density function.

* * * * *